United States Patent [19]

Hodlewsky et al.

[11] 4,436,200

[45] Mar. 13, 1984

[54] LOW FRICTION FLAT-TOP ARTICLE CARRYING CHAIN

[75] Inventors: Wasly G. Hodlewsky, Greendale; William H. Bloedorn, West Allis, both of Wis.

[73] Assignee: Rexnord Inc., Milwaukee, Wis.

[21] Appl. No.: 59,851

[22] Filed: Jul. 23, 1979

Related U.S. Application Data

[63] Continuation of Ser. No. 653,564, Jan. 29, 1976, abandoned, which is a continuation of Ser. No. 225,845, Feb. 14, 1972, abandoned.

[51] Int. Cl.$^3$ ............................................. B65G 17/40
[52] U.S. Cl. .................................... 198/851; 198/957; 252/12
[58] Field of Search ............... 198/793, 795, 851, 831, 198/830, 957; 252/12; 260/17 R

[56] References Cited

U.S. PATENT DOCUMENTS

| | | | |
|---|---|---|---|
| 3,036,695 | 5/1962 | Thuerman | 198/853 |
| 3,145,825 | 8/1964 | Carter | 198/444 |
| 3,262,550 | 7/1966 | Kampfer | 198/840 |
| 3,669,247 | 6/1972 | Pulver | 198/841 |

OTHER PUBLICATIONS

E. I. Du Pont de Nemours & Co. Technical Services Lab TR 146 Revised 6/14/65 by Paul N. Richardson.

*Primary Examiner*—E. R. Kazenske
*Assistant Examiner*—Douglas D. Watts
*Attorney, Agent, or Firm*—Theresa F. Camoriano

[57] ABSTRACT

An article carrying conveyor chain includes a series of links having parts which slide on flat, spaced supporting rails which also provide the chain with lateral guidance. The link parts engaging the rails are an injection molded thermoplastic having dispersed throughout small particles of a low-friction material such that the exposed portions of the particles provide a dry film lubricant which, as the chain is used, becomes distributed over all of the several surfaces having frictional engagement with the supported articles and with rails. Where the entire link is of integral molded construction, the bearing surface of the link with the connecting pin is thus also provided with the dry film lubricant.

6 Claims, 8 Drawing Figures

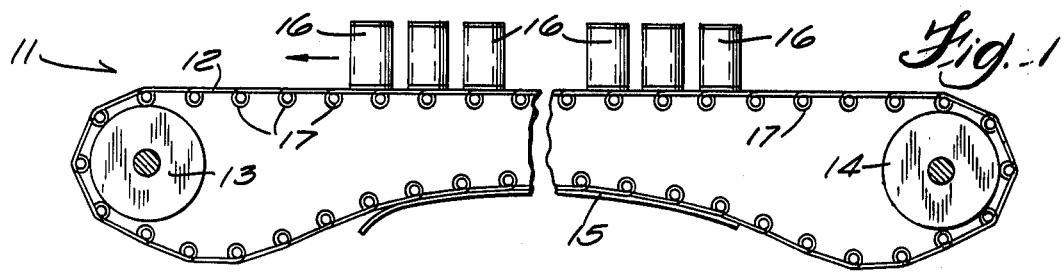
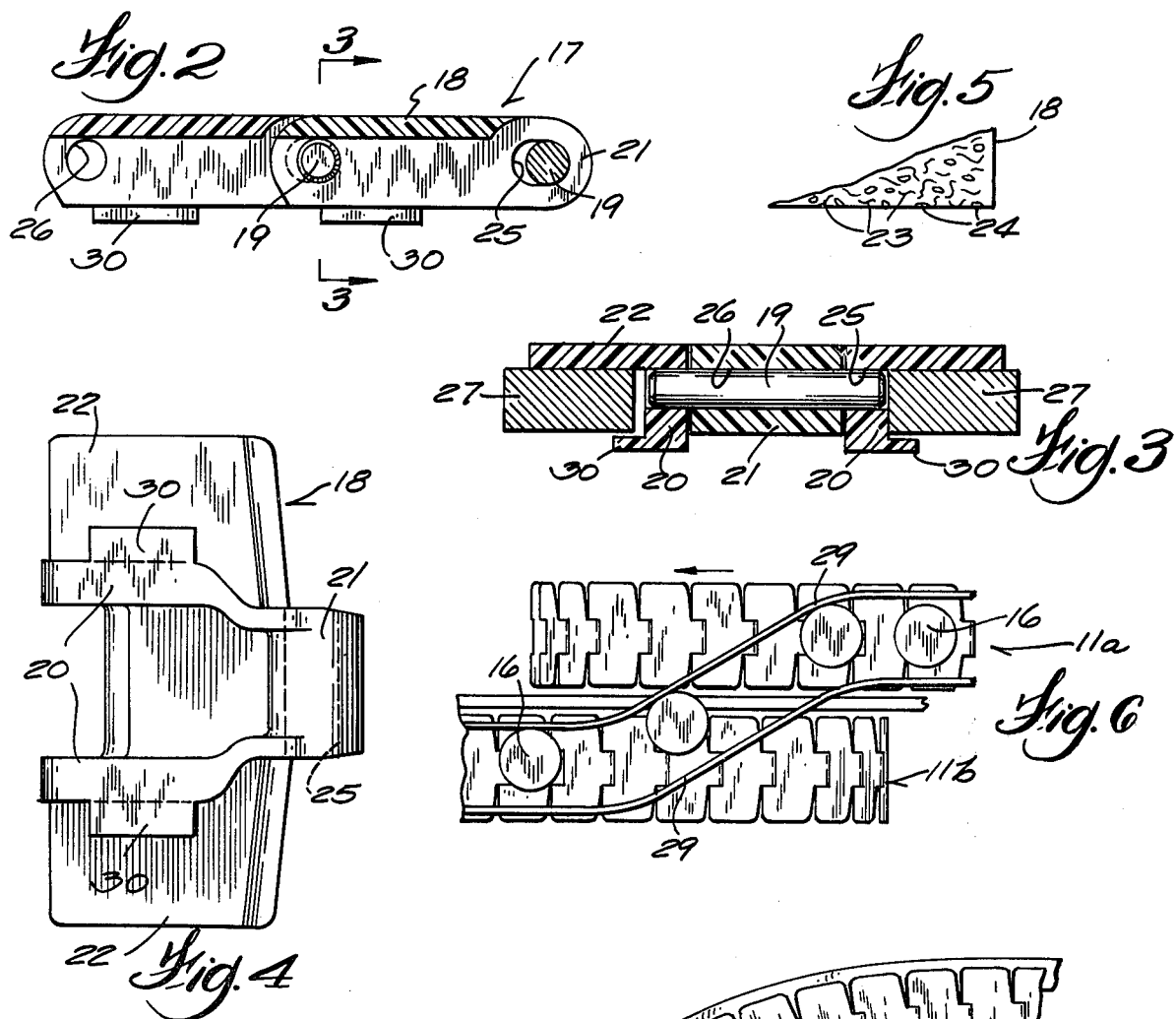

LOW FRICTION FLAT-TOP ARTICLE CARRYING CHAIN

This is a continuation of application Ser. No. 653,564 filed Jan. 29, 1976 and which was a continuation of application Ser. No. 225,845 filed on Feb. 14, 1972 and both abandoned.

BACKGROUND OF THE INVENTION

U.S. Pat. No. 2,911,091 shows a flat top article carrying conveyor chain which is of molded construction. U.S. Pat. Nos. 3,262,550 and 3,279,586 show similar chain which are particularly suited to operation in a straight or a curved path. U.S. Pat. No. 2,954,113 shows a similar conveyor chain of another type which comprises a side-flexing roller chain and a series of top plates of molded plastic having downward legs which fit over the extended pins of the pin links of the chain and form part of such links. The undersides of the plates of all such chain slide on the spaced supporting rails and the links carried by the top plates fit between the rails. At locations where the conveyor has a curved path, the sides of the links slide on the outer face of the inner support rail.

U.S. Pat. Nos. 2,998,397, 3,287,288, 3,453,208, and 3,455,864 describe various types of resin materials with low friction particles dispersed therein for use as bearings. However, none of these patents suggest the use of such bearing material to comprise the molded links of an article-carrying conveyor chain.

SUMMARY OF THE INVENTION

Conveyor chain links or parts thereof are molded of Teflon-filled resin in proportions which effect no measurable reduction in the strength of the links and provide a high value of load per unit of area times surface velocity so that throughout sustained operation the temperature and coefficient of friction remain in equilibrium and thus wear remains low.

BRIEF DESCRIPTION OF THE DRAWINGS

FIG. 1 is a side view of reduced scale showing the elements of a conveyor carrying articles thereon. The elongated center section of the conveyor is not shown.

FIG. 2 is a side elevation of several links of one type of conveyor chain.

FIG. 3 is a vertical transverse section through one of the links on line 3—3 of FIG. 2.

FIG. 4 is a plan view of the bottom side of the link parts shown in FIG. 2.

FIG. 5 is an illustrative, enlarged cross-section of a portion of the conveyor link part shown in FIGS. 2-4.

FIG. 6 is a plan view of reduced scale showing parts of adjacent conveyors and several articles being transferred from one conveyor to the other by the side guides which are carried by the frame of the conveyors.

FIG. 7 is a plan view of reduced scale showing a curved section of an article conveyor. And FIG. 8 is a vertical transverse cross section through the inverted return run of the conveyor chain and showing an alternate method of supporting the return run.

The conveyor 11 shown in FIG. 1 includes the chain 12 operating over the drive sprocket 13 and the driven wheel 14, shown diagrammatically. The lower inverted return run of chain 12 is supported by and slides on the support strip 15. The articles 16 are carried by the upper carrying run of chain 12 which is supported as will be described.

Each link 17 includes a molded link part 18 and a connecting pin 19. Each link part 18 is of integral molded construction and includes the two side members 20, the cross-member or barrel 21 which joins the trailing ends of members 20, and the top plate 22 which overlies the barrel and cross members.

According to the prior art, each link part has in the past been molded of a thermoplastic material having the necessary tensile strength, dimensional and chemical stability and wear resistance. A proprietary acetal resin sold under the trademark "Delrin" is an exemplary material in these respects and has, as well, a moderately low coefficient of friction. However, and as is regularly the case, the wear rate of the material greatly increases with the higher operating temperatures which may be due to excessive pressure per unit of area and/or frictional velocity. These factors have limited the total length of conveyors, the number of turns a single conveyor might be allowed, the weight of the articles being carried and the speed of the conveyor.

According to the present invention, each link part 18 is molded of a suitable thermoplastic material such as "Delrin" but with low friction particles dispersed in the raw material so that these particles appear at the several operational surfaces of the molded link to provide the same with a greatly reduced coefficient of friction. The comparison here has reference to the coefficient of friction of Delrin or the same material without the additional particles. With reference to FIG. 5, the particles include the filaments 23 and the flakes 24 or both, embedded and dispersed in the resin matrix 18a of the part.

Any suitable low-friction material may be employed. At the present time, a proprietary polytetraflourethylene resin sold under the trademark "Teflon" is considered the main choice for such material. The material should be in particles of very small size and may be short filaments or the like.

Various techniques may be used to assure the dispersion of the particles throughout the raw material which is supplied to the cavity of the mold not shown. This may require some attention because a relatively low percentage of the low-friction material is required, such as one to fifteen percent by weight and depending upon the extent to which the coefficient of friction is a limiting factor in the design of the conveyor.

After molding, the link may be annealed in oil, glycol or air if considered desireable and at a temperature between 200° F. and 300° F. The low friction particles must, of course, be unaffected by any such temperature.

It is also essential that the low friction particles extend to and appear at the surfaces of the molded link so that immediately upon operation of the conveyor, particles provide a dry-film lubricant over the frictional surfaces of the conveyor. In that regard, it should be noted that the frictional surfaces of each link part so referred to include the top side of the plates, the undersides, the bores in which the pins turn, the sides which guide the chain, and the tabs where employed, as will be described.

Members 20 of each link part 18 are arranged in plan so that their rear ends fit between the forward ends of the members of the following link whereby each two adjacent links may be connected for articulation by the connecting pin 19. For that purpose, the center section of each pin is turnable in the bore 25 of the barrel 21 of the respective link and the ends of the pin are secured and carried in the aligned bores 26 of the forward ends of the members of the following link.

To allow chain 12 to flex laterally so that the conveyor path may be curved where necessary or desired, the bore 25 of barrel 21 is suitably enlarged and the clearances provided between the top plates 22 are sufficient to allow each two adjacent links to pivot within limits about a vertical axis which is at or near the centerline of the links.

The upper carrying run of chain 12 is supported by the spaced, parallel guide rails 27 which are fixed to and form a part of the conveyor frame, not shown, which generally stands on and is secured to the floor of the building. The two guide rails 27 are spaced to allow the members 20 of the conveyor links to move freely therebetween and are of a suitable wear and corrosion resistant material for direct sliding engagement with the undersides of the sideward extending parts of the top plates 22 of the links. The guide rails also determine the path of the conveyor so that members 20 of each may also engage and slide over the adjoining sides of the rails.

With reference to FIG. 6, parts of two similar conveyors 11a and 11b are shown carrying the articles 16 between the parallel side guides 29 which are arranged to transfer or move the articles from conveyor 11a to conveyor 11b. Such movement of the articles tends to shift the path of the conveyor chain and will cause the links to slide against one of the two guide rails of each conveyor. With reference to FIG. 7 and where the chain moves in a curved path, the chain is drawn toward the inside of each curve such that the "inside" member 20 of each link is forced against and slides over the outer curved surface of the inside curved guide rail as shown in FIG. 3.

In some conveyor installations the tension applied to chain 12 by the drive sprocket 13 may tend to lift the chain so that it jumps from between the curved guide rails. As a precaution, each link part 18 may optionally include the lower tabs 30 which are integrally formed with the link parts 18 and project oppositely from members 20 beneath the two guide rails but with some clearance at any and all locations along the path of the conveyor. Tabs 30 positively prevent the chain from lifting from the rails 27 if and when that might occur. Another expedient which serves to prevent such an occurrence is to provide the interengaging surfaces of the rails 27 and the members 20 with a "negative" draft or angularity as shown, described and claimed in U.S. Pat. No. 3,262,550.

The tabs 30 may also serve to support the return run of the conveyor chain as shown in FIG. 8. The two parallel support guides 32 are spaced to allow the chain links 17 to operate therebetween. The top plates 22 extend beneath the guides 32 and the tabs 30 slide on the guides for the support of the chain.

The particles 23 and 24 which are exposed at the various surfaces of the top plates 22, side members 20 and tabs 30 provide all of the same with reduced frictional drag which in turn lowers the friction level to below that which causes overheating of the guideways.

The improvement provided by the present invention in otherwise identical chain of the prior art is shown by the reduced factors which determine the length or serviceability of the conveyor. The coefficient of friction in one case was reduced from 0.38 to 0.2. This means that a given conveyor might be increased 90% in length. Similarly, the corner factor for a 90° turn was reduced from 1.6 to 1.2. This means that three 90° turns might be employed in a conveyor where only one 90° turn was formerly permitted.

An additional improvement is provided by the invention where articles must slide on the conveyor or conveyors as shown in FIG. 6, for example. The tendency of some articles to tip over readily is significantly reduced. Where a large number of accumulated articles are standing on the conveyor moving there beneath, the drag and chain pull as well as possible marking of the articles are greatly reduced.

An alternate form of conveyor chain with which the invention may be employed is shown in U.S. Pat. No. 2,954,113 which has previously been referred to. The molded link parts of such chain may also comprise a resin matrix with interspersed low friction particles in accordance with the present invention.

I claim:

1. A chain comprising links interconnected by pins for articulation and having a tensile strength, wear resistance and low coefficient of friction for operation on rigid supporting guide ways of a dissimilar material, the improvement wherein each such link comprises an injection molded thermoplastic unitary monolithic acetal resin with a uniform dispersion of random oriented tetraflouroethylene monofilamentous fibers in a selected proportion embedded therein, said proportion being less than that which would measurably reduce the tensile strength of the link, the comparison being with similarly connected links molded under the same conditions entirely of the same acetal resin alone and using the same accepted measurement procedure, and said proportion being greater than 1.3% by weight and such that the number of fibers exposed to the guide ways are sufficient to reduce the coefficient of friction of the link with the guide ways to 0.2, said coefficient being well below that indicated by accepted test procedures using test specimens of the same resin with the same fibers in said proportion.

2. The invention of claim 1 wherein each link includes (1) lower, laterally spaced portions having bores through which the interconnecting pins extend and have side faces for lateral frictional contact with the side of the guide ways and (2) an upper flat portion having lower faces resting on and in frictional contact with the upper surfaces of the guide strip, and an upper flat face on which articles are adapted to be supported and over which the articles slide while being detained or moved laterally out or from said upper surface, said improvement providing said bores and all said several faces with lubricious prooperties and low coefficients of friction respectively as to the pins, the guide ways and the articles being conveyed.

3. A conveyor including a chain as defined in claim 1 and a sprocket and guideways as referred to, each link part having an upper surface for the support of the articles to be conveyed.

4. A conveyor as defined in claim 3, said conveyor having upper and lower spaced guideways, each of said link parts having separate upper and lower flat surfaces for operation over the respective guideways.

5. The conveyor of claim 3 wherein the guideways include a curved section, the inner guideway of said section having a vertical face which is engaged by the corresponding sides of the link parts and determines the curved path of the conveyor, the force of said engagement being a function of the chain tension and weight of the articles carried by the chain.

6. The conveyor of claim 3 which further includes guide means disposed above the chain for controlling the movement of the articles carried by the link parts, such controlled movement requiring that the articles slide on the upper surfaces of the link parts, the improvement wherein the said particles provide a dry lubrication of said surfaces which lubrication is effective to reduce significantly the damage to the articles by scraping or tipping.

* * * * *